No. 645,317.
H. H. FLANDERS.
PACKAGE HANDLE.
(Application filed Aug. 1, 1899.)
Patented Mar. 13, 1900.
(No Model.)
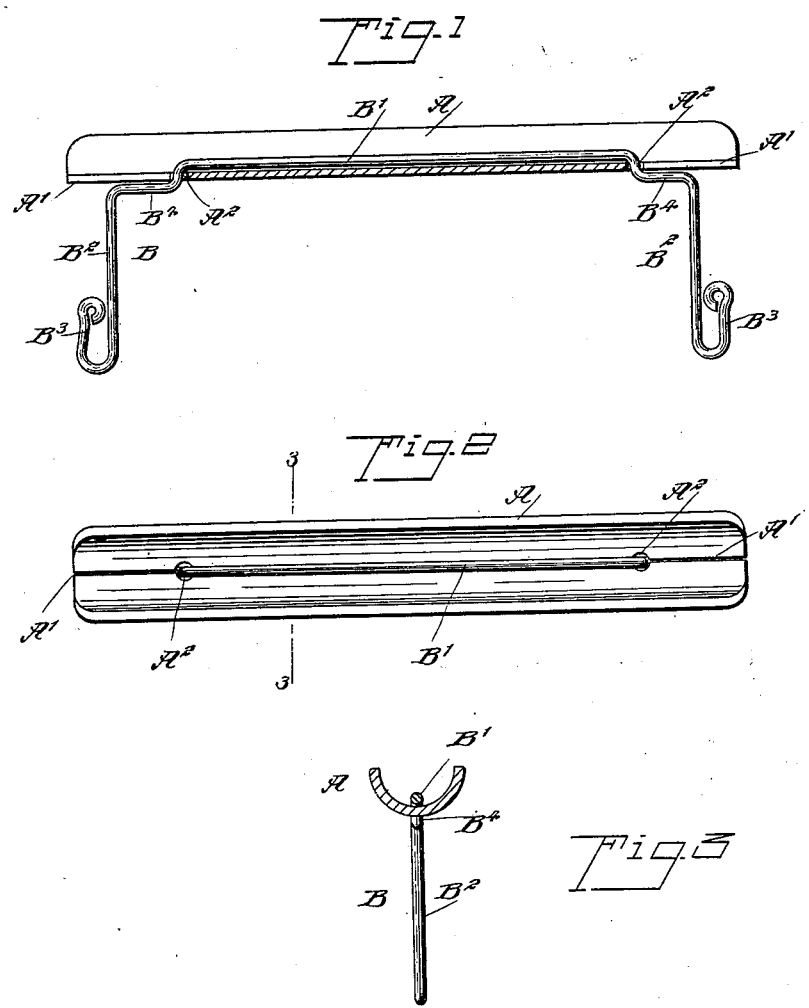
WITNESSES:
INVENTOR
Henry H. Flanders
BY
ATTORNEYS

UNITED STATES PATENT OFFICE.

HENRY HARRISON FLANDERS, OF BOSTON, MASSACHUSETTS.

PACKAGE-HANDLE.

SPECIFICATION forming part of Letters Patent No. 645,317, dated March 13, 1900.

Application filed August 1, 1899. Serial No. 725,742. (No model.)

*To all whom it may concern:*

Be it known that I, HENRY HARRISON FLANDERS, of Boston, (Neponset,) in the county of Suffolk and State of Massachusetts, have invented a new and Improved Package-Handle, of which the following is a full, clear, and exact description.

The object of the invention is to provide a new and improved package-handle which is simple and durable in construction, arranged to permit of manufacturing it extremely cheap, and requiring no soldering or other fastening means for holding the wire yoke in position on the handle proper.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 1 is a longitudinal sectional elevation of the improvement. Fig. 2 is a plan view of the same, and Fig. 3 is a transverse section of the same on the line 3 3 in Fig. 2.

The improved package-handle illustrated in the drawings consists of the handle proper, A, and a yoke B, said handle being made trough-shaped, of paper, pasteboard, leather, or other suitable material, with longitudinally-extending slits A' at the ends of the handle, at the bottom thereof, the inner ends of the slits terminating in apertures $A^2$. The yoke B is preferably made of wire bent approximately into U shape, as shown, with the middle portion extending lengthwise in the bottom of the handle from one aperture $A^2$ to the other aperture, the sides $B^2$ of the yoke extending through the apertures approximately at a right angle to the middle portion B' and the handle A. The lower ends of the sides $B^2$ of the yoke terminate in upwardly-extending hooks $B^3$ for engaging the cord or other wrapper of the package or bundle.

As shown in Fig. 1, the sides $B^2$ are provided near their upper ends with inwardly-extending horizontal offsets $B^4$, arranged to underlie the inner portions of the slits A', so as to reinforce the ends of the handle.

In assembling the handle and the yoke the sides $B^2$ of the latter are forced through the slits A', which yield sufficiently to allow the passage of the sides until they enter the apertures $A^2$, the resiliency of the handle material being sufficient to again close the handle ends after the passage of the sides through the slits, so that the handle assumes its former natural position.

By the arrangement described no soldering or other fastening means is required for securely holding the yoke in position in the handle, and consequently very little labor is required in assembling the parts, and as the parts can be cheaply manufactured it is evident that the entire package-handle can be produced at an extremely-low cost.

Having thus fully described my invention, I claim as new and desire to secure by Letters Patent—

1. A package-handle, comprising a trough-shaped handle formed at its ends with longitudinal slits terminating at their inner ends in apertures, and a wire yoke approximately U-shaped and extending with its middle portion on the upper surface of the bottom of the trough-shaped handle, the sides passing through said apertures to depend from the handle a distance from the ends thereof, the lower ends of said sides terminating in upwardly-extending hooks, and said sides being formed in their upper ends with horizontal offsets underlying the handle at the inner portions of said slits, as set forth.

2. A package-carrier comprising a trough-shaped handle having slits extending longitudinally from its ends and terminating in enlargements or apertures, and a yoke having a central member extending on the upper surface of the trough between the said apertures, then passing downward through said apertures and having horizontal offsets underlying the slitted portions of the handle, and hooked end members extending downwardly from said offsets.

HENRY HARRISON FLANDERS.

Witnesses:
C. H. GILFILLAN,
C. C. GILFILLAN.